US007233148B2

(12) United States Patent
Hergt et al.

(10) Patent No.: US 7,233,148 B2
(45) Date of Patent: Jun. 19, 2007

(54) SHEATH WAVE BARRIER UNIT

(75) Inventors: Martin Hergt, Dortmund (DE); Arne Reykowski, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 265 days.

(21) Appl. No.: 11/095,171

(22) Filed: Mar. 31, 2005

(65) Prior Publication Data

US 2005/0270116 A1 Dec. 8, 2005

(30) Foreign Application Priority Data

Mar. 31, 2004 (DE) ...................... 10 2004 015 856

(51) Int. Cl.
*G01V 3/00* (2006.01)

(52) U.S. Cl. ...................... 324/322; 324/318; 333/24.2

(58) Field of Classification Search ................ 324/322, 324/318; 333/24.2
See application file for complete search history.

(56) References Cited

U.S. PATENT DOCUMENTS

| | | | | |
|---|---|---|---|---|
| 4,922,204 | A * | 5/1990 | Duerr et al. | 324/322 |
| 5,294,886 | A | 3/1994 | Duerr | |
| 5,410,251 | A * | 4/1995 | Renz | 324/318 |
| 5,432,488 | A | 7/1995 | Kotani et al. | |
| 5,477,147 | A * | 12/1995 | Friedrich et al. | 324/322 |
| 6,320,385 | B1 * | 11/2001 | Burl et al. | 324/322 |
| 6,825,661 | B2 | 11/2004 | Leussler | |
| 7,170,293 | B2 * | 1/2007 | Kess | 324/322 |
| 2005/0231300 | A1 * | 10/2005 | Greim et al. | 333/24 C |

FOREIGN PATENT DOCUMENTS

| | | |
|---|---|---|
| DE | 296 23 129 | 3/1998 |

* cited by examiner

*Primary Examiner*—Lóuis M. Arana
(74) *Attorney, Agent, or Firm*—Schiff Hardin LLP

(57) ABSTRACT

A sheath wave barrier unit for an outer shielding of a coaxial cable that also has an inner conductor, has two sheath wave barriers that damp or suppress sheath waves that are induced in two series conductor segments of the outer shielding. Each sheath wave barrier forms a resonant oscillating circuit at a predetermined high frequency, with the high frequency being the same for both sheath wave barriers. The sheath wave barrier unit has a shielding device with at least one radial shield by means of which the sheath wave barriers are decoupled from one another. The sheath wave barriers and the shielding device are arranged on a common carrier.

8 Claims, 1 Drawing Sheet

SHEATH WAVE BARRIER UNIT

BACKGROUND OF THE INVENTION

1. Field of the Invention

The present invention concerns a sheath wave barrier unit for an outer shielding (jacket) of a coaxial cable that also has an inner conductor, of the type having first and second sheath wave barriers, the first sheath wave barrier damping or suppressing sheath waves that are induced in a first conductor segment of the outer shielding and the second sheath wave barrier damping or suppressing the sheath waves that are induced in a second conductor segment of the outer shielding that is in series with the first conductor, wherein each sheath wave barrier forms a resonant oscillator circuit at a predetermined high frequency with the high frequency being the same for both sheath wave barriers.

2. Description of the Prior Art

Sheath wave barriers are used in the feed lines and return lines of local coils of magnetic resonance systems. They serve to damp to suppress sheath waves (standing waves) that would otherwise be induced in the outer shieldings of these lines due to the strong radio-frequency fields used for the excitation of magnetic resonances without the sheath wave barriers. Normally a number of sheath wave barriers are present in each supply or return line, the sheath wave barrier unit being of the type described above. German PS 41 13 120 describes examples of this prior art.

An electrical signal filter having two filter circuits that are decoupled from one another by a shielding device is known from U.S. Pat. No. 5,432,488. The shielding unit has a radial shield, a tangential shield arranged on the radial shield, as well as annular shields. The tangential shield and the annular shields essentially completely encapsulate the filter circuits. The radial shield decouples the filter circuits from one another. The filter circuits can be connected with the inner conductor of a coaxial cable via an input connector and an output connector.

The basic magnetic field of the magnetic resonance system is normally 0.2 to 1.5 Tesla in conventional systems. The magnetic resonance frequency corresponding with this field for the detection of hydrogen (which is the most common operational use) is approximately 8.5 to 63.5 MHz. At these magnetic resonance frequencies, the individual sheath wave barriers can be separated from one another by a distance such that they barely mutually influence one another.

Magnetic resonance system also are known in which the basic magnetic field is greater than 1.5 Tesla, sometimes 2.5 Tesla and more. The magnetic resonance frequency has increases to over 100 MHz. At this frequency, a significantly stronger excitation of sheath waves occurs in the outer shielding of the feed and leakage lines. More sheath wave barriers therefore must be used, so the distance between the individual sheath wave barriers is reduced and as a result, an unwanted mutual influencing between barriers occurs. Due to the stronger excitation of sheath waves, the sheath waves must be more strongly damped, such that the voltage load, the current load and the thermal load of the sheath waves increase.

SUMMARY OF THE INVENTION

An object of the present invention is to further develop a sheath wave barrier. unit of the type initially described, such that the aforementioned problems associated with the prior art are prevented.

This object is achieved in accordance with the invention by a sheath wave barrier unit of the type initially described that also has a shielding device with at least one radial shield by means of which the sheath wave barriers are decoupled from one another, with the sheath wave barriers and the shielding device being arranged on a common carrier or substrate.

Many sheath wave barriers thus can be arranged in a narrow space, such that effective suppression or damping of the sheath waves is possible. Only a very slight to nonexistent mutual influencing of the sheath wave barriers occurs. The voltage load, the current load and the thermal load of the individual sheath wave barriers are also relatively small.

In an embodiment the shielding device also has a tangential shield that is disposed on the radial shield and that surrounds the first and the second conductor section of the outer shielding as well as the sheath wave barriers. The mutual decoupling of the sheath wave barriers in this embodiment is even more effective.

The mutual decoupling of the sheath wave barriers can be made even more effective when the shielding device has annular shields disposed at the ends of the tangential shield remote from the radial shield, and that, viewed outwardly from the tangential shield, extend toward the outer shield.

The sheath wave barriers each can include a capacitor and the capacitors can be arranged at ends of the sheath wave barriers facing away from one another. The capacitive coupling of the sheath wave barriers is already quite low in this embodiment when considered separately. The coupling can be still further reduced by extending the tangential shield extends over the capacitors.

The sheath wave barriers can be fashioned, for example, as barrier pots, each with a pot base and pot walls, surrounding the outer shielding, with the ends of the pot walls remote from the pot base being capacitively coupled with the outer shielding via the capacitors.

In this embodiment, the radial shield preferably is formed by at least one of the pot bases. The tangential shield preferably is identical with the pot walls.

When the pot bases of the sheath wave barriers are fashioned as one common (shared) pot base, a still-further simplification of the sheath wave barrier unit is achieved.

As an alternative to the embodiment of the sheath wave barriers as barrier pots with pot bases and pot walls, it is also possible for the outer shield to be wound into coils with a number of windings in the region of the sheath wave barriers.

If the sheath wave barriers are fashioned identically, a standardization of the design and, moreover, a uniform load of the individual sheath wave barriers results in operation.

As mentioned above, one problem, which the present invention is designed to solve, occurs with magnetic resonance systems employing a high basic magnetic field of 2.5 Tesla and more. The predetermined high frequency at which the sheath wave barriers form a resonant oscillating circuit therefore is preferably greater than 100 MHz.

DESCRIPTION OF THE PREFERRED EMBODIMENTS

Figure 1:
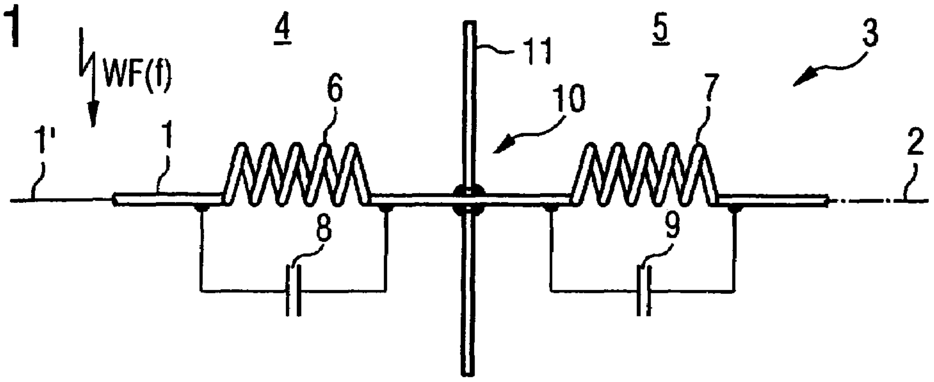
FIG. 1 illustrates the basic principle of the inventive sheath wave barrier unit.

As shown in FIG. 1, a coaxial cable has an outer shield 1 with a conductor axis 2. The coaxial cable also has an inner conductor 1' that coincides with the conductor axis 2.

In magnetic resonance systems, sheath waves can be induced in the outer shield 1 by a radio-frequency electromagnetic alternating field in the environment of the outer shield 1 with a frequency f of typically more than 100 MHz. To suppress or damp such sheath waves, the inventive sheath wave barrier unit 3 has a first sheath wave barrier 4 and a second sheath wave barrier 5. The first sheath wave barrier 4 suppresses or damps sheath waves that are induced in a first conductor segment 6 of the outer shield 1. The second sheath wave barrier 5 likewise damps or suppresses sheath waves that are induced in a second conductor segment 7 of the outer shield 1. The conductor segments 6, 7 are thereby arranged in series.

In order to be able to damp or suppress sheath waves, each sheath wave barrier 4, 5 forms an oscillating circuit that is resonant at a predetermined high frequency. The predetermined high frequency is thereby the same for both sheath wave barriers 4, 5 and equal or at least approximately equal to the frequency f of the radio-frequency alternating field WF.

The sheath wave barriers 4, 5 are fashioned identically. To form the oscillating circuits, they have respective capacitors 8, 9 with a capacitance as well as an inductance. The inductance is formed according to FIG. 1, by the coaxial cable—and with it the outer shield 1—being wound into coils each with a number of. windings in the region of the sheath wave barriers 4, 5.

To decouple the sheath wave barriers 4, 5, the sheath wave barrier unit 3 has a shielding device 10 in addition to the sheath wave barriers 4, 5. The shielding device 10 preferably is formed of metal, for example copper or aluminum. According to FIG. 1, it has at least one radial shield 11. The sheath wave barriers 4, 5 are decoupled from one another by means of the shielding device 10.

In principle, the sheath wave barrier unit 3 is operable without shielding device 10, but the sheath wave barriers 4, 5 then would not be decoupled from one another. The entire sheath wave barrier unit 3 would therefore fail given a failure of one of the sheath wave barriers 4, 5. In contrast to this, with the shielding device 10 the functioning of the sheath wave barrier 4, 5 that has not failed is maintained.

Figure 2:
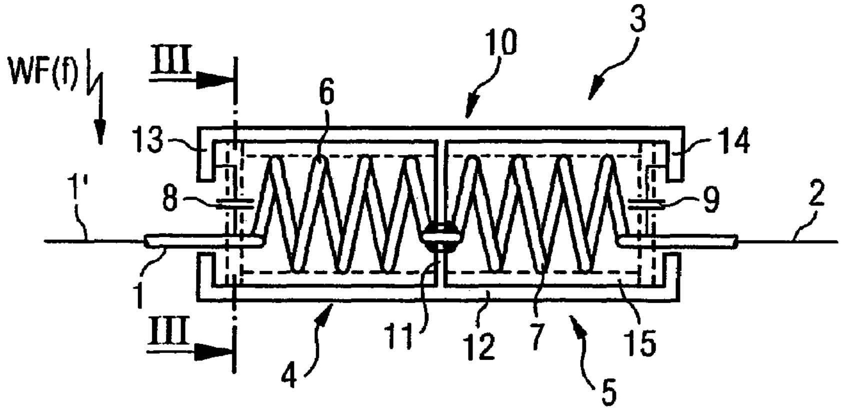
FIG. 2 is a first exemplary embodiment of the inventive sheath wave barrier unit.
Figure 3:
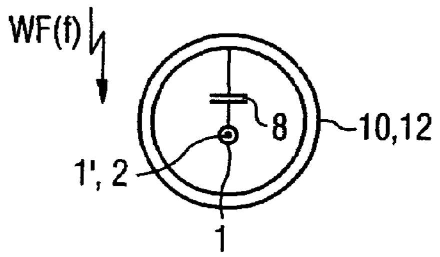
FIG. 3 is a section through FIG. 2 along the line III—III.

FIGS. 2 and 3 now show a first advantageous embodiment of the basic principle according to FIG. 1. The variations specified in connection with FIGS. 2 and 3 can be realized substantially independently of one another.

The shielding device 10 according to FIG. 2 has a tangential shield 12 in addition to the radial shield 11. The tangential shield 12 is disposed on the radial shield 11, and surrounds the conductor segments 6, 7 of the outer shield 1 as well as the sheath wave barriers 4, 5. The tangential shield 12 extends over the capacitors 8, 9. This is the case even though the capacitors 8, 9 according to FIG. 2 are disposed at ends of the sheath wave barriers 4, 5 facing away from one another, and the electromagnetic coupling is therefore already minimized by the arrangement of the capacitors 8, 9.

A significant improvement of the decoupling of the sheath wave barriers 4, 5 is already achieved with the above modification of the radial shield 11 by the tangential shield 12, but this decoupling can be still further increased. For this purpose, the shielding device 10 has annular shields 13, 14. The annular shields 13, 14 are disposed at the ends of the tangential shield 12 remote from the radial shield 11. They extend to the outer shield 1, as seen from the tangential shield 12.

Furthermore, in the embodiment according to FIGS. 2 and 3 the sheath wave barriers 4, 5 and the shielding device 10 are arranged on a common carrier. The carrier 15 is formed of an electrically-insulating material, for example plastic. Pre-assembly of the sheath wave barrier unit 3 is possible by the use of the common carrier 15.

Figure 4:
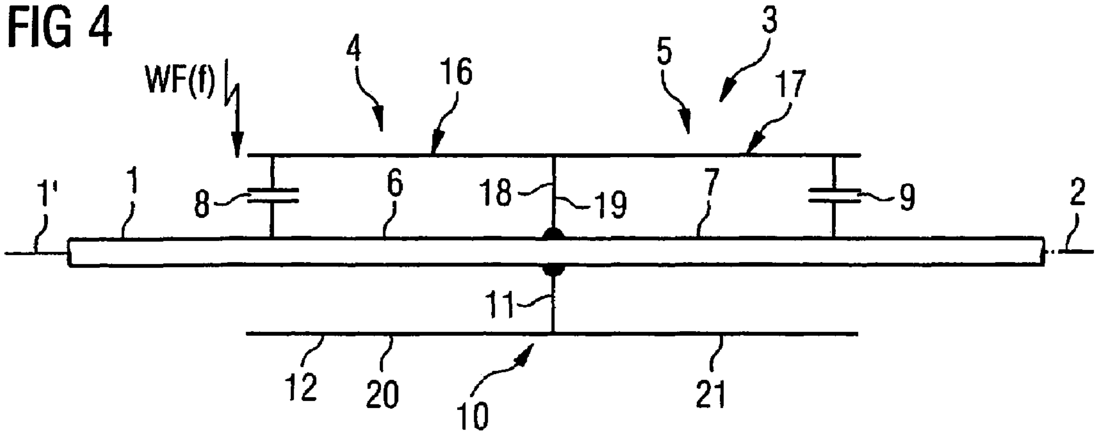
FIG. 4 is a second exemplary embodiment of the inventive sheath wave barrier unit.

FIG. 4 shows a second embodiment of the inventive basic principle of FIG. 1. In this embodiment the sheath wave barriers 4, 5 are fashioned as barrier pots 16, 17 that surround the outer shield 1. They have pot bases 18, 19 and pot walls 20, 21. The ends of the pot walls 20, 21 remote from the pot bases 18, 19 are capacitively coupled with the outer shield 1 via the capacitors 8, 9.

According to FIG. 4, the pot bases 18, 19 of the sheath wave barriers 4, 5 are fashioned as a shared pot base that is identical with the radial shield 11 of the shielding device 10. The radial shield 11 thus is formed by the pot bases 18, 19. The tangential shield 12 of the shielding device 10 is also identical with the pot walls 20, 21, and extends over the capacitors 8, 9.

In the embodiment according to FIG. 4, the sheath wave barriers 4, 5 are fashioned identically and form resonant oscillating circuits at the predetermined high frequency f of the alternating field WF of over 100 MHz. The sheath wave barriers 4, 5 and the shielding device 10 are also disposed on a common carrier 15. Only the annular shields 13, 14 are not present in the embodiment according to FIG. 4, but they could also be present.

A number of advantages can be achieved by the inventive sheath wave barrier unit 3.

For example, many sheath wave barriers 4, 5 can be aligned on a narrow space, for example .by stringing together a number of sheath wave barrier units 3 of the type specified above. Sheath waves thereby have virtually no opportunity to form on the entire outer shield 1.

The voltages and currents induced by the sheath waves are relatively slight with regard to the individual sheath wave barriers 4, 5. Moreover, the induced voltage is distributed among multiple capacitors 8, 9, so that the locally occurring electrical fields are smaller. Because of this feature, a relatively slight thermal load of the sheath wave barriers 4, 5 occurs.

Furthermore, by the combination of two (or more) sheath wave barriers 4, 5 into a sheath wave barrier unit 3, the operating safety of the sheath wave barrier unit 3 is increased. Given a failure of one of the sheath wave barriers 4, 5, at least a partial damping or, respectively, partial suppression of the sheath waves still maintained.

Although modifications and changes may be suggested by those skilled in the art, it is the intention of the inventors to embody within the patent warranted hereon all changes and modifications as reasonably and properly come within the scope of their contribution to the art.

We claim as our invention:

1. A sheath wave barrier unit for an outer shielding of a coaxial cable, said coaxial cable also comprising an inner conductor, said sheath wave barrier unit comprising:

a first sheath wave barrier and a second sheath wave barrier;

said first sheath wave barrier damping sheath waves induced in a first conductor segment of said outer shielding;

said second sheath wave barrier damping sheath waves induced in a second conductor segment of said outer shielding in series with said first conductor segment;

each of said first and second sheath wave barriers forming a resonant circuit at the same predetermined high frequency;

a shielding device having at least one radial shield that decouples said first and second sheath wave barriers from each other; and a carrier at which said first and second sheath wave barriers and said shielding device are disposed.

2. A sheath wave barrier unit as claimed in claim 1 wherein said shielding device comprises a tangential shield disposed on said radial shield and surrounding said first and second conductor segments and said first and second sheath wave barriers.

3. A sheath wave barrier unit as claimed in claim 2 wherein said tangential shield has opposite ends, and said shielding device comprising annular shields respectively disposed at said opposite ends of said tangential shield and extending from said tangential shield to said outer shielding.

4. A sheath wave barrier unit as claimed in claim 1 wherein each of said first and second sheath wave barriers comprises a capacitor, the respective capacitors being disposed at respective ends of said first and second sheath wave barriers facing away from each other.

5. A sheath wave barrier unit as claimed in claim 4 comprising a tangential shield disposed on said radial shield and surrounding said first and second conductor segments and said first and second sheath wave barriers, and extending over the respective capacitors.

6. A sheath wave barrier unit as claimed in claim 1 wherein said outer shield comprises a plurality of coil windings substantially coinciding with said first and second sheath wave barriers.

7. A sheath wave barrier unit as claimed in claim 1 wherein said first sheath wave barrier is identical to said second sheath wave barrier.

8. A sheath wave barrier unit as claimed in claim 1 wherein said high frequency is greater than 100 MHz.

* * * * *